Dec. 30, 1969  E. PERSSON  3,487,286
POWER TRANSMISSION PLANT FOR HIGH VOLTAGE DIRECT CURRENT
Filed Dec. 14, 1967

INVENTOR.
ERIK PERSSON
BY
Jennings Bailey Jr

United States Patent Office 3,487,286
Patented Dec. 30, 1969

3,487,286
POWER TRANSMISSION PLANT FOR HIGH
VOLTAGE DIRECT CURRENT
Erik Persson, Vasteras, Sweden, assignor to Allmänna
Svenska Elektriska, Aktiebolaget, Vasteras, Sweden
Continuation-in-part of application Ser. No. 674,971,
Oct. 12, 1967. This application Dec. 14, 1967, Ser.
No. 690,637
Claims priority, application Sweden, Oct. 13, 1966,
13,869/66
Int. Cl. H02m 3/22, 5/40
U.S. Cl. 321—2                                5 Claims

ABSTRACT OF THE DISCLOSURE

A power transmission plant for high voltage comprises rectifier and inverter stations each having a current regulator, a circuit for setting a desired transmission current (current order) having its input connected to the current setting means, and an arrangement for measuring the actual transmission current (current response); the current order in the rectifier station is greater than that in the inverter station by a predetermined current marginal; a device in the rectifier station adds an auxiliary current quantity to the current order in both stations when the current response is less than the current order.

PRIOR APPLICATIONS

This application is a continuation-in-part of application Ser. No. 674,971 filed Oct. 12, 1967.

BACKGROUND OF THE INVENTION

Field of the invention

The present invention relates to a power transmission plant for high voltage direct current comprising a rectifier station and an inverter station connected together by a direct current line.

The prior art

Normally such a transmission plant is controlled according to the current marginal principle described in British Patent No. 599,435 (Japanese Patent No. 233,-984) and the book of Adamson and Hingorani: High Voltage Direct Power Transmission, London 1960 chapter 5, where both the rectifier station and the inverter station are provided with a current regulator to set a certain current value in each station, the current values being so chosen that the rectifier station current adjustment exceeds the inverter station current adjustment by a certain quantity, the so-called current marginal. Usually this current marginal is reached by supplying the same current adjustment, herein called the "current order," to both stations at the same time as a magnitude corresponding to the desired current marginal is subtracted from the current adjustment in the inverter station. With a control according to this principle, one station, usually the inverter station, will be determining for the direct voltage of the transmission plant, while the other station determines the magnitude of the direct current transmitted.

More exactly, the control operates in such a way that the rectifier station by means of its delay angle control system for its rectifiers increases its direct voltage in order to produce the preset current, while the inverter station in the same way increases its counter-voltage in order to limit the current in agreement with the lower resulting current order in this station. The result of this opposition will be that the station with the lowest voltage resources—usually the inverter station—increases its voltage to the maximum while the other—the rectifier station—increases its voltage so much that it can exceed the voltage of the former station and the voltage drop in the transmission line when the transmission current is equal to the current order of the latter station.

The current adjustment in the current regulators of the stations is carried out externally and may, for example, be derived from a certain transmitted power or from a certain desired frequency in the alternating current network connected to the inverter station.

The current marginal principle provides an extremely safe and stable control of the transmission. However, it has the disadvantage that when the current control goes over to the inverter station, which occurs when the direct voltage of the rectifier decreases, for example due to the disconnection of a converter in the rectifier station, the current will be limited by the current marginal, which is even more inconvenient since with limited transmission voltage it is often desired to operate with maximum current in order to have as little reduction in power as possible.

SUMMARY OF THE INVENTION

In order to avoid this disadvantage it is now proposed to measure the "current error,'" that is, the difference between the current order and the measured, actual current, which actual current is herein called the "current response,'" in the rectifier station and to supply this current error as an auxiliary current order to the regulators in both stations. The result can be taken as if the current marginal in the form of a negative auxiliary current order in the inverter station were replaced by a positive auxiliary current order or current marginal in the rectifier station.

A power transmission plant according to the invention is thus characterized in that in the rectifier station is a device for comparing the current order and the current response, which device, when the current response is less than the current order, adds to the current order in both stations a certain quantity, called the "auxiliary current order."

BRIEF DESCRIPTION OF THE DRAWINGS

The invention will be further described with reference to the accompanying drawing, where FIGURE 1 shows a power transmission plant with a device according to the invention, while

DESCRIPTION OF THE PREFERRED
EMBODIMENTS

Figure 1:
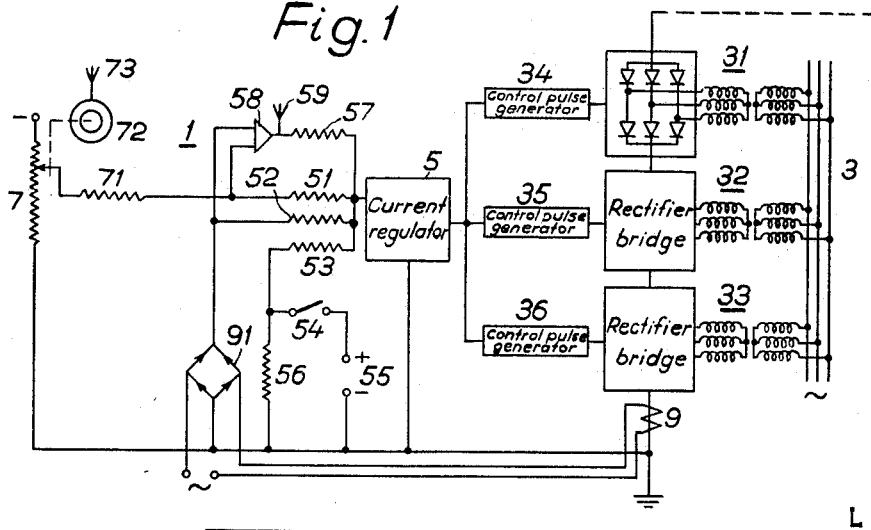
Figure 1:
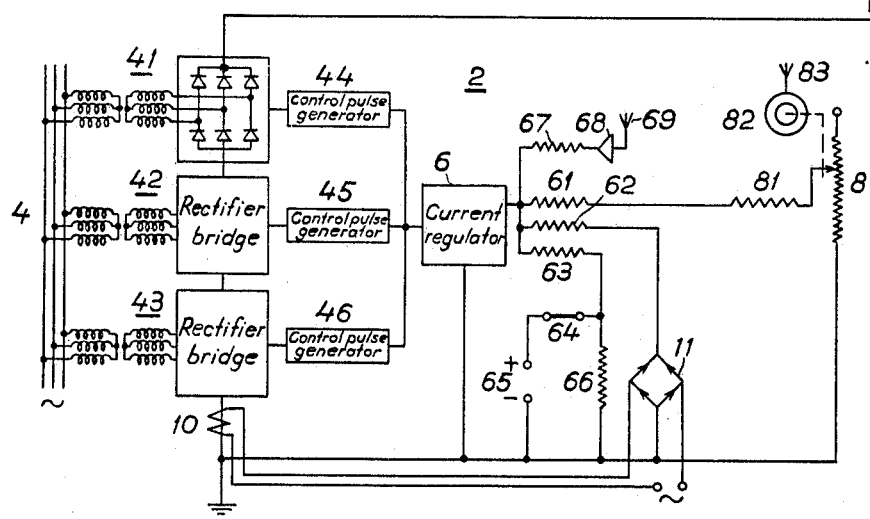

FIGURE 1 shows a direct current power transmission plant comprising two converter stations, a rectifier station 1 and an inverter station 2, connected each to its own AC network 3 and 4, respectively and inter-connected with a DC line L. Each station comprises three converters 31–33 and 41–43, respectively, and each converter is provided with a delay angle control device 34–36 and 44–46, respectively, which delay angle control device is built up like a control pulse generator, for instance as shown in the above mentioned book of Adamson and Hingorani, FIGURES 4.6 or 4.12, arranged to deliver control pulses to the rectifiers in the proper converter. The delay angle control devices in each station are controlled from a common current regulator 5 and 6, respectively, and each current regulator is provided with three inputs having corresponding input resistors 51–53 and 61–63, respectively. To the first input resistance 51 and 61, respectively, in each current regulator is supplied the current order from a current adjustment device consisting of a potentiometer 7 and 8, respectively, connected between earth and a negative voltage. The variable output from the potentiometer is, through a resistance 71 and 81, respectively, connected to the corresponding input on the current regulator 5 and 6, respectively. These current adjustment devices are set depending on the control program determined for the transmission and if, for example, a certain transmitted power is desired, it is possible to derive from this power magnitude and the direct voltage of the transmission any desired transmission direct current desired at any moment. In this case it is usually assumed that the outputs on the potentiometers in both stations are set for the same quantity, for example by means of adjusting devices 72 and 82 connected together over a tele-link which has been indicated by aerial symobls 73 and 83. In order to achieve a difference in the current adjustment in the two stations, a so-called current marginal, a special current marginal device has been arranged in each station consisting of a voltage source 55, 65, respectively, connected over a resistor 56, 66, respectively, and connected to the input resistor 53, 63, respectively. The current marginal device is activated with the help of a contact 54, 64, respectively which in the rectifier station is open but in the inverter station is closed. In this way, in the inverter station, the voltage from the voltage source 65 will be subtracted from the current order obtained from the potentiometer 8.

In order to be able to supply the current regulators with a measurement of the actual direct current, "current response" measuring transductors 9, 10, respectively have been connected in the direct current line in both the stations. The alternating current signal obtained from the transductors is rectified in the rectifier bridges 91, 11, respectively and the rectified signal is connected to the input resistor 52, 62, for the current regulator in question. The regulators 5 and 6 are built up like amplifiers giving an output signal in dependence on the algebraic sum of the input signals of the regulators. Said output signal in the form of a direct voltage is fed to an input circuit in each of the control devices 31–33 and 41–43, respectively, which input circuit is formed like a phase shifter, for instance as shown in the above book of Adamson and Hingorani, Figure 4.3.

A transmission plant according to FIGURE 1 operates in such a way that current regulators in both the stations endeavour to adjust the corresponding delay angle device for the converters in such a way that the current response measured by the measuring transductors 9, 10, respectively, corresponds to the current order set in the respective current regulator. Since the current order adjusted in the rectifier station exceeds the resultant current order adjusted in the inverter station, which in this station consists of the difference between the current order from the potentiometer 8 and the current, marginal device 64–66, the rectifier station will increase its direct voltage in order to maintain greater current while the inverter station in turn will increase its direct voltage in order to force down the direct current coming from the rectifier station. The result is a struggle between the two stations and the rectifier station is therefore suitably equipped with such voltage resources that it will prevail, that is, increase its voltage so much that the transmitted direct current will equal the value set in the current regulator of the rectifier station. The rectifier station will thus increase its direct voltage until this is equal to the sum of the maximum possible counter voltage in the inverter station and the ohmic voltage drop in the transmission. In this way it will be said counter-voltage in the inverter station which will dictate the direct voltage of the transmission, while the rectifier station dictates the transmission current.

If it is now imagined that a fault occurs in a converter in the rectifier station, this converter will be by-pass connected with the help of a by-pass means, not shown, whereby the voltage resources of the rectifier station will usually be less than the counter voltage of the inverter station and the transmitted direct current will thus decrease rapidly.

As a result of this not even the lowest current order set in the current regulator of the inverter will be fulfilled and the current regulator 6 therefore reduces the counter-voltage of the inverter in order to increase the transmitted direct current. In this way the transmission will be maintained in any case, but now with the transmitted current limited by the current marginal. The transmitted power will therefore be limited both due to the voltage drop caused by the removal of a converter in the rectifier station and by the current limited by the current marginal.

In order to avoid this extra and unnecessary current limitation, according to the invention a means has been inserted in the rectifier station 1, in the form of an amplifier 58, the input side of which is fed with the difference between the current order from the potentiometer 7 and the current response from the bridge 91. This current error is fed over the resistor 57 into the current regulator 5 as an auxiliary current order and, over a tele-link indicated by the antennae 59 and 69, an amplifier 68 and a resistor 67, the same auxiliary current order is fed into the current regulator 6 in the inverter station.

The result is an increase in the general current order for both stations, whereby the negative current marginal in the inverter station is transferred to a positive current marginal in the rectifier station so that the transmission current now dictated by the inverter station will be approximately equal to the previous current.

From the above it is seen that only a positive addition to the current is allowable and in order to secure this the output signal from the amplifier 58 should be limited in one direction to zero. Also the auxiliary current order should not exceed that corresponding to the current marginal and the output signal in the other direction should therefore be limited corresponding to the current marginal.

It should also be pointed out that the current marginal must never disappear if the stability of the plant is to be ensured. Normally the signal arising from the amplifier 58 will first be active in the regulator 5 whereas the transmission to the regulator 6 will delay a certain time, although this may be extremely short. Upon a changeover to normal operation the current response in the rectifier station will exceed the current order from the potentiometer 7, whereby the signal from the amplifier 58 disappears. It must then be ensured that the auxiliary current order over the resistor 57 is maintained until the auxiliary order over the resistor 67 in the inverter station has disappeared, which may be done by making the resistor 57 as a reactive impedance element with smaller time constant for increasing output signals from the amplifier 58 and higher time constant for decreasing output signals, brought about, for example, by an inductance parallel-connected with a diode.

As mentioned above the auxiliary current order should be equal to the current marginal and this may therefore be taken out from permanent voltage sources of fixed magnitude and connected by simple connection means controlled by the comparing means in the rectifier station. In this case the members 57–59 and 67–69 in FIGURE 1 can be constructed as shown in FIGURES 2a and b.

Figure 2A:
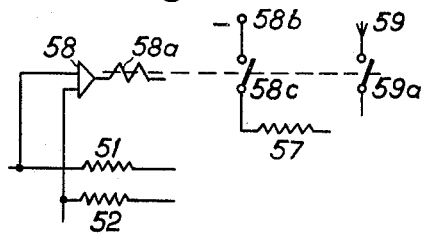
FIGURES 2a and 2b show variants of the device according to FIGURE 1.
Figure 2B:
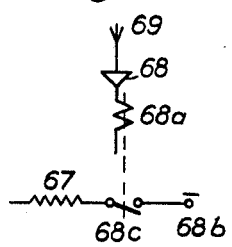

In FIGURE 2a a polarized relay 58a with delay switching on and switching off is connected on the output side of the amplifier 58 in FIGURE 1. The relay closes when the output voltage of the amplifier exceeds a certain small positive value for a short time and opens when this same voltage has adopted a negative value for a short time. The relay 58a controls a contact 58c by means of which a voltage source 58b, the value of which corresponds to the current marginal, is connected to the input 57 in FIGURE 1. If therefore the numerical value of the current response is for a certain time less than the current order, the relay 58a closes and the auxiliary current order is connected to the current regulator of the rectifier station. At the same time a contact 59a closes and a signal is sent through the antenna 59 to the antenna 69 in FIGURE 2b whereby a relay 68a is influenced over the amplifier 68. The contact 68c is then closed and thus the voltage source 68b, the value of which corresponds to the auxiliary current order, is connected to the input 67.

When the voltage resources in the rectifier station have been regained, this station will increase its voltage in order to fulfill the resulting current order in this station which is the sum of the auxiliary order set on the potentiometer 7 and that given by the source 58b. The current response over the input 52 will then exceed the current order over the input 51 and after a little while, therefore, the relay drops out. Thus the opening of the contact 58c should be delayed in relation to the contact 59a to ensure that the current marginal in the inverter station has returned to normal by opening the contact 68c before the auxiliary current order in the rectifier station is disconnected. Possible maintenance of the auxiliary current order can be ensured by parallel-connecting the contact 58c with a capacitor which during its charging time will bridge the contact 58c.

In practice the relay connections shown in FIGURES 2a and b can be replaced by electronic connections wherein the relay 58a is replaced by a flip-flop connection which is so adjusted that it operates when the current fault has during a certain short period increased to some percent of the rated current and the flip-flop connection returns when the current fault has become negative for a similar period of time.

I claim:

1. Power transmission plant for high voltage direct current comprising a rectifier station and an inverter station connected by a direct current line, each station being provided with a means for setting a desired transmission current value, and a current regulator having its input side connected to said current setting means, and with a means for measuring the actual transmission current, the current set by said current setting means in the rectifier station being in excess of the current set by said current setting means in the inverter station by a predetermined current marginal, in which the rectifier station includes a device for comparing the current set by said current setting means and the actual transmission current, which comparing device includes means responsive to a value of the actual transmission current lower than the current set by said current setting means to add to the current set by the current setting means in both stations an auxiliary current quantity.

2. Power transmission plant according to claim 1, in which said comparing means in the rectifier station includes amplifier means to the input side of which the current setting means and current measuring means are connected, whereas the output side of said amplifier means is connected to the input side of the current regulators in both stations.

3. Power transmission plant according to claim 1, in which said comparing means in the rectifier station comprises a switching means responsive to the difference between the currents set by the current setting means and measured by the current measuring means, which switching means includes means to connect the auxiliary current quantity adding means to both stations.

4. Power transmission plant according to claim 3, in which in each station a voltage source is arranged, the output signal of which corresponds to the current marginal, and means for connecting said voltage source to the corresponding current regulator, said connecting means being controlled by said switching means in the rectifier station.

5. Power transmission plant according to claim 1, in which means are provided for connecting the auxiliary current quantity adding means first and disconnecting it last in the rectifier station.

References Cited

UNITED STATES PATENTS 3,339,083  8/1967  Uhlman _____ 321—2 X

LEE T. HIX, Primary Examiner

W. H. BEHA, JR., Assistant Examiner

U.S. Cl. X.R.

321—11